United States Patent
Molisch et al.

(10) Patent No.: US 7,382,840 B2
(45) Date of Patent: Jun. 3, 2008

(54) RF SIGNAL PROCESSING IN MULTI-ANTENNA SYSTEMS

(75) Inventors: Andreas Molisch, Arlington, MA (US); Sun Yuan Kung, Princeton, NJ (US); Xinying Zhang, Princeton, NJ (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 776 days.

(21) Appl. No.: 10/629,240

(22) Filed: Jul. 29, 2003

(65) Prior Publication Data

US 2005/0025271 A1 Feb. 3, 2005

(51) Int. Cl.
*H04B 7/10* (2006.01)
(52) U.S. Cl. ............... 375/347; 375/267; 375/295; 375/299; 375/316; 342/432; 370/339; 455/13.3; 455/101; 455/132
(58) Field of Classification Search ............... 455/41.2, 455/151.2, 101; 375/347, 267, 295, 316; 348/554
See application file for complete search history.

(56) References Cited

U.S. PATENT DOCUMENTS

| | | | | |
|---|---|---|---|---|
| 5,510,799 A * | 4/1996 | Wishart | .......... | 342/373 |
| 6,144,711 A * | 11/2000 | Raleigh et al. | .......... | 375/347 |
| 6,377,631 B1 | 4/2002 | Raleigh | .......... | 375/299 |
| 6,704,368 B1 * | 3/2004 | Nefedov | .......... | 375/265 |
| 6,937,592 B1 * | 8/2005 | Heath et al. | .......... | 370/342 |
| 7,050,510 B2 * | 5/2006 | Foschini et al. | .......... | 375/299 |
| 2002/0085643 A1 * | 7/2002 | Kitchener et al. | .......... | 375/267 |
| 2003/0006933 A1 * | 1/2003 | Kasperkovitz et al. | ...... | 342/368 |
| 2004/0146014 A1 * | 7/2004 | Hammons et al. | .......... | 370/320 |

FOREIGN PATENT DOCUMENTS

WO  WO 02/47286  6/2002

OTHER PUBLICATIONS

Auer et al. (Channel estimation for OFDM systems with multiple transmit antennas by exploiting the properties of the discrete Fourier transform; PIMRC 2003; Sep. 7-10, 2003 pp. 1954-1958).*

(Continued)

*Primary Examiner*—David C. Payne
*Assistant Examiner*—Adolf DSouza
(74) *Attorney, Agent, or Firm*—Dirk Brinkman; Clifton D. Mueller; Gene V. Vihokur

(57) ABSTRACT

A method for antenna subset selection by joint processing in RF and baseband in a multi-antenna systems. $L_t$ input data streams are generated in a transmitter for either diversity transmission or multiplexing transmission. These streams are modulated to RF signals. These signals are switched to the t branches associated with the t transmit antennas, and a phase-shift transformation is applied to the RF signals by a t×t matrix multiplication operator $\Phi_1$, whose output are t≧$L_t$ RF signals. These signals are transmitted over a channel by t antennas. The transmitted signals are received by r antennas in a receiver. A phase-shift transformation is applied to the r RF signals by a r×r matrix multiplication operator $\Phi_2$. $L_r$ branches of these phase shifted streams are demodulated and further processed in baseband to recover the input data streams.

13 Claims, 3 Drawing Sheets

OTHER PUBLICATIONS

Abdul Aziz et al; Indoor throughput and range improvements using standard compliant AP antenna diverity in IEEE 802.11a and ETSI HIPERLAN/2; VTC 2001; Oct. 7-11, 2001; pp. 2294-2298).*

U.S. Appl. No. 09/769,445, filed Jan. 26, 2001, Gore et al.

Gore et al., "MIMO Antenna Subset Selection with Space-Time Coding," *IEEE Trans. Signal Processing*, vol. 50, No. 10, pp. 2580-2588, Oct. 2002.

Bölcskei et al., "Performance of Space-Time Codes in the Presence of Spatial Fading Correlation," *Proc. Asilomar Conf. Signals, Syst. Comput.*, pp. 687-693, Nov. 2000.

Molisch et al., "Reduced-Complexity Transmit/Receive-Diversity Systems", submitted to IEEE Trans. Signal Processing, 2002.

Vaughn and Anderson, *Channels, propagation, and antennas for mobile communications*, Chapter 9, pp. 629-680, IEE Press, 2003.

Molisch et al., "FFT-based Habrid Antenna Selection Schemes for Spatially Correlated MIMO Channels", to be submitted to IEEE Communication Letter.

Asztely, "On Antenna Arrays in Mobile Communication Systems : Fast Fading and GSM Base Station Receiver Algorithms", Tech. Rep. IRS3-SB-9611, Royal Institute of Technology, Stockholm, Sweden, Mar. 1996.

Telatar et al., "Capacity of Multi-Antenna Gaussian Channels," *European Trans. on Telecomm.*, vol. 10, No. 6, pp. 585-596, Nov.-Dec. 1999.

Tarokh et al., "Space-Time Codes for High Data Rate Wireless Communication: Performance Criterion and Code Construction," *IEEE Trans. Inform. Theory*, vol. 44, pp. 744-765, Mar. 1999.

Molisch et al., "Capacity of MIMO Systems with Antenna Selection," *Proc. IEEE Intl. Comm. Conf.*, pp. 570-574, 2001.

Shiu et al., "Fading Correlation and Its Effect on the Capacity of Multi-element Antenna Systems," *IEEE Trans. Commun.*, col. 48, pp. 502-513, Mar. 2000.

Tse et al., "Capacity Scaling in Dual-Antenna-Array Wireless Systems", IEEE Trans. Inf. Theory, Jun. 2000, submitted.

* cited by examiner

RF SIGNAL PROCESSING IN MULTI-ANTENNA SYSTEMS

FIELD OF THE INVENTION

The invention relates generally to multi-antenna communication systems, and more particularly to processing RF signals transmitted through spatially correlated channels in such systems.

BACKGROUND OF THE INVENTION

Multi-antenna systems are widely considered to be the most viable way for significantly increasing the bandwidth efficiency of wireless data transmission systems. In MIMO (multiple input multiple output) systems, multiple antennas are deployed both at the transmitter and the receiver. In MISO (multiple input single output) systems, the receiver has only one antenna, and the multiple transmit antennas are used for transmit diversity. In SIMO (single input multiple output) systems, the transmitter has a single antenna, and multiple antennas are used at the receiver.

Given multiple antennas, the spatial dimension of the channel can be exploited to improve the performance of the wireless link. The performance is often measured as the average bit rate (bit/s) the wireless link can provide, or as the average bit error rate (BER), depending on the application.

Given a multi-antenna channel, a duplex method, and a transmission bandwidth, the multiple-antenna system can be categorized as narrowband or wideband (i.e., the channel is flat or frequency selective fading within the system bandwidth), and possessing either full, partial or no channel state information (CSI).

Multiple antennas provide enhanced performance. Studies show that the multiple antennas can be used to provide spatial diversity, and/or can increase the information-theoretic capacity (data rate), see, e.g., Vaughn and Anderson, *Channels, propagation, and antennas for mobile communications*, IEE Press, 2003, Telatar et al., "Capacity of Multi-Antenna Gaussian Channels," *European Trans. on Telecomm.*, Vol. 10, No. 6, pp. 585-596, November-December 1999, Winters, "On the Capacity of Radio Communication Systems with Diversity in Rayleigh Fading Environments," *IEEE J. Selected Areas Comm.*, 1987, and Tarokh et al., "Space-Time Codes for High Data Rate Wireless Communication: Performance Criterion and Code Construction," *IEEE Trans. Inform. Theory*, Vol. 44, pp. 744-765, March 1999.

However, as a disadvantage, operation with multiple RF chains increases complexity and cost. An antenna selection technique can be used to determine an optimal subset of antennas. This still yields improved performance while reducing the number of required RF chains, see Molisch et al., "Capacity of MIMO Systems with Antenna Selection," *Proc. IEEE Intl. Comm. Conf.*, pp. 570-574, 2001, and Gore et al., "MIMO Antenna Subset Selection with Space-Time Coding," *IEEE Trans. Signal Processing*, Vol. 50, No. 10, pp. 2580-2588, October 2002.

Most prior art antenna selection techniques have focused only on selecting a subset of antennas before down-conversion and processing in baseband. This (spatial) antenna selection techniques work reasonably well under some circumstances, namely in the case that (i) the number of selected antennas is only slightly smaller than the number of available elements, and (ii) the MIMO channel is spatially uncorrelated.

However, in reality, correlated scattering at both the transmitter and receiver antenna arrays is more usual. Due to the directional transmission in the wireless environment, the signal waveforms can be highly correlated depending on the departure and arriving angles at the antennas.

The prior art antenna selection techniques that operate only in the spatial domain can have a significant degradation in performance when dealing with this correlation. Furthermore, even for weak correlations, the prior art antennas also show a significant performance loss when the number of selected antennas is considerably smaller than the number of available antennas.

Therefore, it is desired to provide an RF signal processing technique that overcomes the problems of the prior art.

SUMMARY OF THE INVENTION

The invention provides a system and method for antenna subset selection in a multi-antenna communication system based on the joint signal processing in radio frequency and baseband. The system is designed for either full diversity transmission or multiplexing transmission, in both correlated and uncorrelated channels.

The invention uses phase-shift operations in radio-frequency (RF) chains. The operations can be performed after antenna selection in the transmitter, or before antenna selection in the receiver, or both.

DETAILED DESCRIPTION OF THE PREFERRED EMBODIMENT

Figure 1:
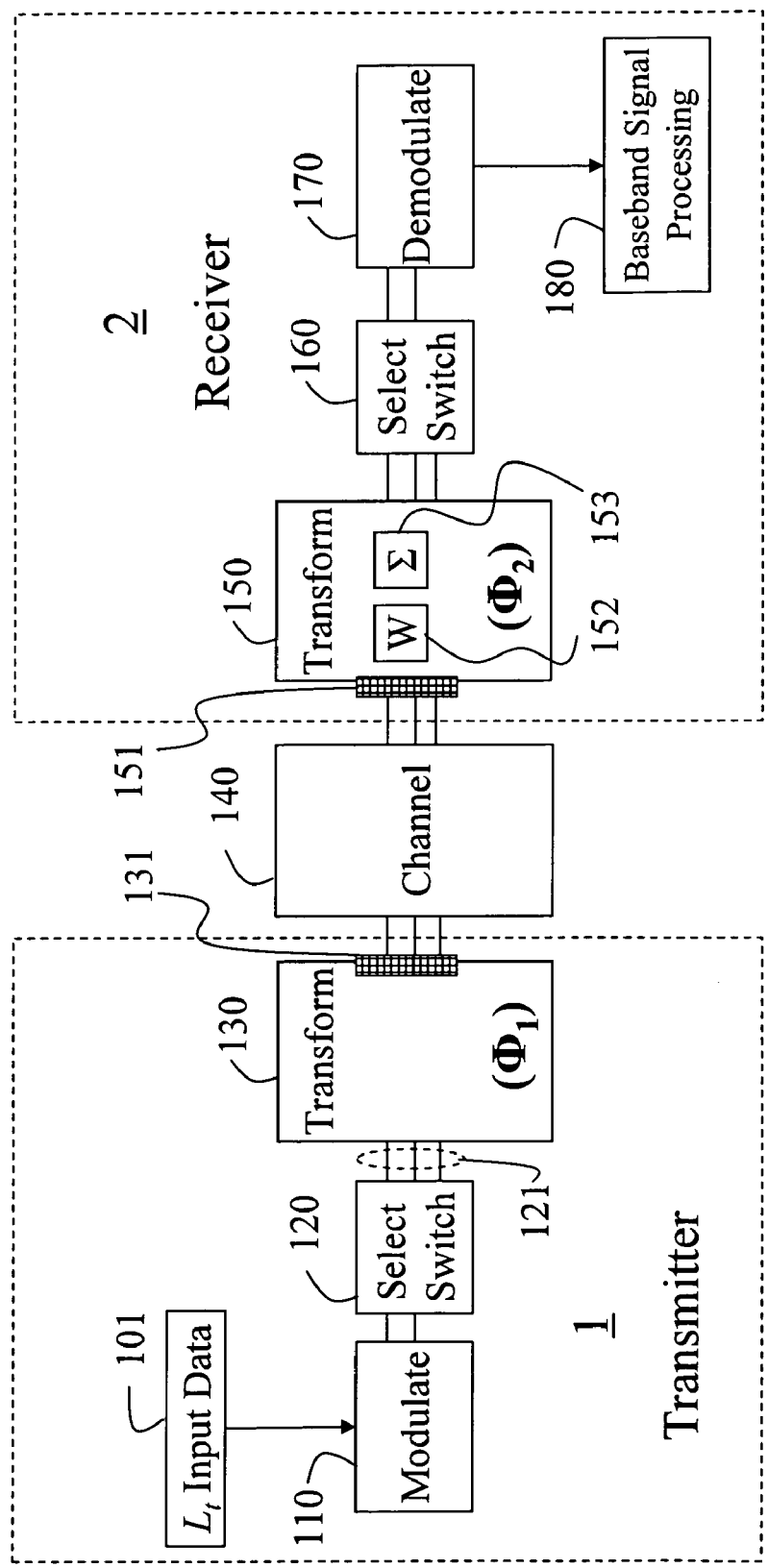
FIG. 1 is a block diagram of a multi-antenna system that uses joint RF/baseband signal processing for antenna selection according to the invention.

FIG. 1 shows a multi-antenna system 100 that uses the antenna selection method according to the invention. In a transmitter 1, $L_t$ data streams 101 are generated. These streams can be either different signals obtained through a space-time coder, i.e., in multiplexing transmission, or the same signal encoded with different weights, i.e., in diversity transmission. The streams are modulated 110 to passband RF signals. A selection switch 120 links these signals to $L_t$ of the t branches 121 associated with the t transmit antennas ($t \geq L_t$) 131. In the new invention, the t passband branches 121 are transformed 130 by a t×t matrix operation $\Phi_1$ before they are applied to the t transmit antennas, and passed through the channel 140.

At a receiver 2, the signals are received via the channel 140 by r receive antennas 151. The received signals are transformed 150 by an r×r matrix operation $\Phi_2$, and $L_r$ of the transformed signals are selected 160, where $L_r \leq r$. The selected signals 161 are demodulated 170 and further processed 180 in baseband for detection of the data streams 101. The concatenation of the $L_t$ out of t switch and the t×t matrix operation $\Phi_1$ can be viewed, and implemented, as a t×$L_t$ matrix operation in both the transmitter and the receiver.

In order to reduce the implementation cost in radio frequency, the entries of the matrix operations usually are constrained to be pure phase shifters without power amplifiers. They can also be done just in the transmitter, or just in the receiver, e.g., by making the corresponding matrix at the other link end, $\Phi_2$ or $\Phi_1$, identity matrices.

System and Channel Model

For the description of the operating principles of the invention, we use a well known channel model, see Shiu et al., "Fading Correlation and Its Effect on the Capacity of Multi-element Antenna Systems," *IEEE Trans. Commun.*, Col. 48, pp. 502-513, March 2000, Bölcskei et al., "Performance Analysis of Space-Time Codes in Correlated Rayleigh Fading Environments," *Proc. Asilomar Conf. Signals, Syst. Comput.*, pp. 687-693, November 2000, Gore et al., "MIMO Antenna Subset Selection with Space-Time Coding," *IEEE Trans. Signal Processing*, Vol. 50, No. 10, pp. 2580-2588, October 2002. However, we note that the invention is in no way dependent on the channel model.

The model for the channel transfer function H is expressed as:

$$H = R^{1/2} W T^{1/2}, \quad (1)$$

where W is a Rayleigh fading matrix with i.i.d. complex Gaussian entries $\sim N_C(0,1)$. The correlation matrices R and T denote receive and transmit correlations, respectively. The sizes of R and T are r×r and t×t, respectively. This model is usually valid when assuming independent transmit and receive correlations.

To facilitate the performance analysis, we introduce the singular value decomposition (SVD) of the transfer function matrix H: $H = U\Sigma V^*$, where U and V are unitary matrices representing the left and right singular vector spaces of H, respectively; and $\Sigma$ is the diagonal matrix consisting of all the singular values of H. For convenience we denote $\lambda_i(H)$ as the i-th largest singular value of matrix H, and $\vec{u}_i(H)$, $\vec{v}_i(H)$ are the left and right singular vectors of H with respect to $\lambda_i(H)$. Here we use '*' to denote the conjugate transpose of a vector or matrix (It reduces to the complex conjugate for a scalar).

Diversity Transmission

Full-Complexity (FC) MRT/MRC Scheme

The system 100 with diversity transmission can be expressed by a linear equation:

$$\vec{x}(k) = H\vec{v}s(k) + \vec{n}(k) \quad (3)$$

where $s(k) \in C$ is the transmitting stream, $\vec{x}(k) \in C^r$ is the set of sample stacks of the complex-valued receiver data sequence. The total transmission power is constrained to P. The thermal noise $\vec{n}(k) \in C^r$ is a white i.i.d Gaussian random process with independent real and imaginary parts and variance $\sigma_n^2 I_r$, and $\vec{v}$ is a t-dimensional transmitter weighting vector satisfying $\|\vec{v}\| = 1$. At the receiver, the received signals $\vec{x}$ are weighted (W) 152 with complex weights $\vec{u}^*$ and summed ($\Sigma$) 153, to give a soft estimate of the transmitted symbol stream.

Without antenna selection, the information stream s(k) is estimated by performing a linear combination of all the r observation streams with a coefficient vector $\vec{u}^*$ at the receiver by:

$$\hat{s}(k) = \vec{u}^* H \vec{v} s(k) + \vec{u}^* \vec{n}(k). \quad (4)$$

The estimate SNR after combining is $$a. \quad \frac{\varepsilon[|\vec{u}^* H \vec{v} s(k)|]^2}{|\vec{u}^* \vec{n}(k)|^2} = \rho \frac{|\vec{u}^* H \vec{v}|^2}{|\vec{u}^*|^2}, \quad (5)$$

where the nominal SNR is $\rho = P/\sigma_n^2$. To maximize the estimate SNR, maximal ratio transmission and maximal ratio combining are used, i.e., $\vec{u}(\vec{v})$ are the singular vectors in U(V) corresponding to the largest singular value $\lambda_1(H)$. The resulting estimated SNR is then $\rho \lambda_1^2(H)$.

Conventional Hybrid Selection (HS) MRT/MRC Method

When $L_r$ out of the r receive antennas are selected and combined, each selection option corresponds to a $L_r \times r$ selection matrix on the transfer function, which extracts $L_r$ out of the r rows of the matrix H that are associated with the selected antennas. We denote $S_r$ as the set of all such selection matrices. Similarly, an $L_t$ out of t selection in the transmit end can be represented by a $t \times L_t$ matrix, and the set of the transmit selection matrices are denoted by S. For any selection option $(S_1 \in S_t, S_2 \in S_r)$, an optimal SNR is achieved via a similar MRT and MRC on the $L_t$ transmit and $L_r$ receive branches respectively:

$$\max_{\vec{u} \in C^{L_r}} \max_{\|\vec{v}\|=1} \rho \frac{\|\vec{u}^* S_2 H S_1 \vec{v}\|^2}{\|\vec{u}\|^2} = \rho \lambda_1^2(S_2 H S_1). \quad (7)$$

The HS-MRC scheme selects the optimal antenna subset selection matrices $(S_1, S_2)$ among all the elements in $S_t$ and $S_r$ that maximize the estimate SNR $$\text{above: } SNR_{HS} = \max_{S_2 \in S_r} \max_{S_1 \in S_t} \rho \lambda_1^2(S_2 H S_1). \quad (8)$$

FFT-Based Method (FFTS)

To cope with the highly correlated MIMO channels, the operation ($\Phi_t$ or $\Phi_r$) 150 can be a fast Fourier transform matrix of the form:

$$i. \quad \Phi_r = \frac{1}{\sqrt{r}} \begin{bmatrix} 1 & 1 & \cdots & 1 \\ 1 & e^{-j\omega_r} & \cdots & e^{-j(r-1)\omega_r} \\ \vdots & \vdots & \ddots & \vdots \\ 1 & e^{-j(r-1)\omega_r} & \cdots & e^{-j(r-1)^2\omega_r} \end{bmatrix},$$

where $W_r = 2\pi/r$. The matrix is normalized to preserve the noise level. Via a similar MRT/MRC on the selected branches after the FFT, the optimal estimate SNR is:

$$SNR_{FFTS} = \max_{S_2 \in S_r} \max_{S_1 \in S_t} \rho \lambda_1^2(S_2 \Phi_r H \Phi_t S_1). \quad (9)$$

Phase-Shift & Selection Method (PSS)

A more general design in our invention is to allow phase-shift-only entries in the transform $\Phi_1$ 130 (and/or $\Phi_2$ 150). In this case, the transform matrix 130 (150) and the selection 120 (160) can be integrated into one $t \times L_t$ (or $L_r \times r$) matrix with phase-shift-only entries. The set of all such transmit (or receive) matrices is denoted by $F_t$ (or $F_r$). In this method, with the two phase-shift matrices $F_1 \in F_t$ and $F_2 \in F_r$, the linear combining is performed on the virtual channel $F_2 H F_1$. As above, the SNR for the optimal choice of $(F_1, F_2)$ is $$SNR_{PSS} = \max_{\vec{u} \in C^{L_r}} \max_{\vec{v} \in C^{L_t}} \max_{F_1 \in F_t} \max_{F_2 \in F_r} \rho \frac{\|\vec{u}^* F_2 H F_1 \vec{v}\|^2}{\|\vec{u}^* F_2\|^2 \|F_1 \vec{v}\|^2}. \qquad (11)$$

When $L_r \geq 2$ and $L_t \geq 2$, the optimal solution for equation (10) can be derived in a closed form. Denote the elements in $F_2$ as $[F_2]_{m,n} = \exp(j\phi_{m,n})$ and the singular vector of H as $\vec{u}_1^*(H) = [\beta_{11} e^{-j\Phi_{11}} \ldots \beta_{r1} e^{-j\Phi_{r1}}]$, an optimum choice of the phases in $F_2$ is $$i. \ \phi_{1,i} = -\varphi_{i,1} - \cos^{-1} \frac{\beta_{i,1}^2 + \beta_{max}\beta_{min}}{\beta_{i,1}(\beta_{max} + \beta_{min})}; \qquad (11)$$

$$\phi_{2,i} = -\varphi_{i,1} + \cos^{-1} \frac{\beta_{i,1}^2 - \beta_{max}\beta_{min}}{\beta_{i,1}(\beta_{max} - \beta_{min})}.$$

where $$\beta_{max} = \max_{1 \leq i \leq r} \beta_{i1} \text{ and } \beta_{min} = \min_{1 \leq i \leq r} \beta_{i1}.$$

The other rows of $F_2$ can be arbitrarily designed. The optimum phase shifters in $F_1$ are derived in a similar fashion with $\vec{u}_1^*(H)$ replaced by $\vec{v}_1^*(H)$. With this choice, the PSS can achieve the same SNR as the FC-MRT/MRC.

When either $L_r=1$ or $L_t=1$ (or both), a closed-form solution to (10) in generally does not exist; we provide a sub-optimal solution which closely approximates the maximization in (10):

$$\phi_{1i} = -\phi_{r1}. \qquad (12)$$

Multiplexing Transmission

Full-Complexity (FC) Scheme

The system 100 with multiplexing transmission is expressed by $$\vec{x}(k) = H\vec{s}(k) + \vec{n}(k), \qquad (13)$$

where $s(k) \in C^r$ is now a t-dimensional vector denoting the different transmitting sequences. The assumptions on the channel and noise are the same as the diversity transmission case. To support multiple data streams, capacity is an important measure for the capacity of the system.

Without antenna selection, the information rate supported by the original channel can be maximized using a "water-filling" power allocation. The capacity of the original system is $$C_{FC} = \sum_{i=1}^{min(t,r)} \left[\log_2 \frac{\rho}{t} \mu \lambda_i^2(H)\right]^+, \qquad (14)$$

where $[a]^+$ is defined as $\max(a, 0)$ and $\mu$ is the constant satisfying $$\sum_{i=1}^{min(t,r)} \left[\mu - \frac{t}{\rho \lambda_i^2(H)}\right]^+ = t.$$

Conventional Hybrid Selection (HS) Method

When $L_t$ ($L_r$) out of the t (r) transmit (receive) antennas are selected, the maximum capacity offered by the conventional antenna selection scheme is $$C_{HS} = \max_{S_1 \in S_t} \max_{S_2 \in S_r} \sum_{i=1}^{k(S_2 H S_1)} \left[\log_2 \frac{\rho}{t} \mu \lambda_i^2(S_2 H S_1)\right]^+,$$

where $\mu$ depends on $(S_1, S_2)$ and satisfies $$\sum_{i=1}^{min(L_t, L_r)} \left[\mu - \frac{t}{\rho \lambda_i^2(S_2 H S_1)}\right]^+ = t.$$

FFT-based Method (FFTS)

Similar to the FFTS in diversity transmission case, the FFT matrix is inserted in the RF chains together with the selection switch. The optimum selection with FFT can deliver a capacity of $$C_{FFTS} = \max_{S_1 \in S_t} \max_{S_2 \in S_r} \sum_{i=1}^{min(L_t, L_r)} \left[\log_2 \frac{\rho}{t} \mu \lambda_i^2(S_2 \Phi_r H \Phi_t S_1)\right]^+, \qquad (16)$$

with the constraint $$\sum_{i=1}^{min(L_t, L_r)} \left[\mu - \frac{t}{\rho \lambda_i^2(S_2 \Phi_r H \Phi_t S_1)}\right]^+ = t.$$

Phase-Shift & Selection Method (PSS)

For PSS method, we use the same notations as before $$C_{PSS} = \max_{F_1 \in F_t} \max_{F_2 \in F_r} \sum_{i=1}^{L} \left[\log_2 \frac{\rho}{t} \mu \lambda_i^2(F_2 H F_1)\right]^+$$

Partial CSI

In the case that the channel is only partially estimated, the invention provides an alternative method. In this case, there is no knowledge about the instantaneous channel state, but rather only about the state of the channel averaged over a time interval, e.g., typically, but not restricted to, several milliseconds to several hundreds of milliseconds. This case typically occurs for the transmitter in a frequency-division duplexing system, In that case, the goal of the transformation is to transform the transmit signal in such a way that on average the signals after the selection process has good properties, e.g., high capacity.

The expected value capacity that can be achieved that way is $$E\{C_{PSS}\} = \max_{F_1 \in \mathcal{F}_t} \max_{F_2 \in \mathcal{F}_r} E\left\{\sum_{i=1}^{L}\left[\log_2 \frac{\rho}{t}\mu\lambda_i^2(F_2 H F_1)\right]^+\right\}.$$

The expected value of the capacity is only one possible criterion. Other criteria result in different values for the capacity matrix.

Effect of the Invention

Figure 2:
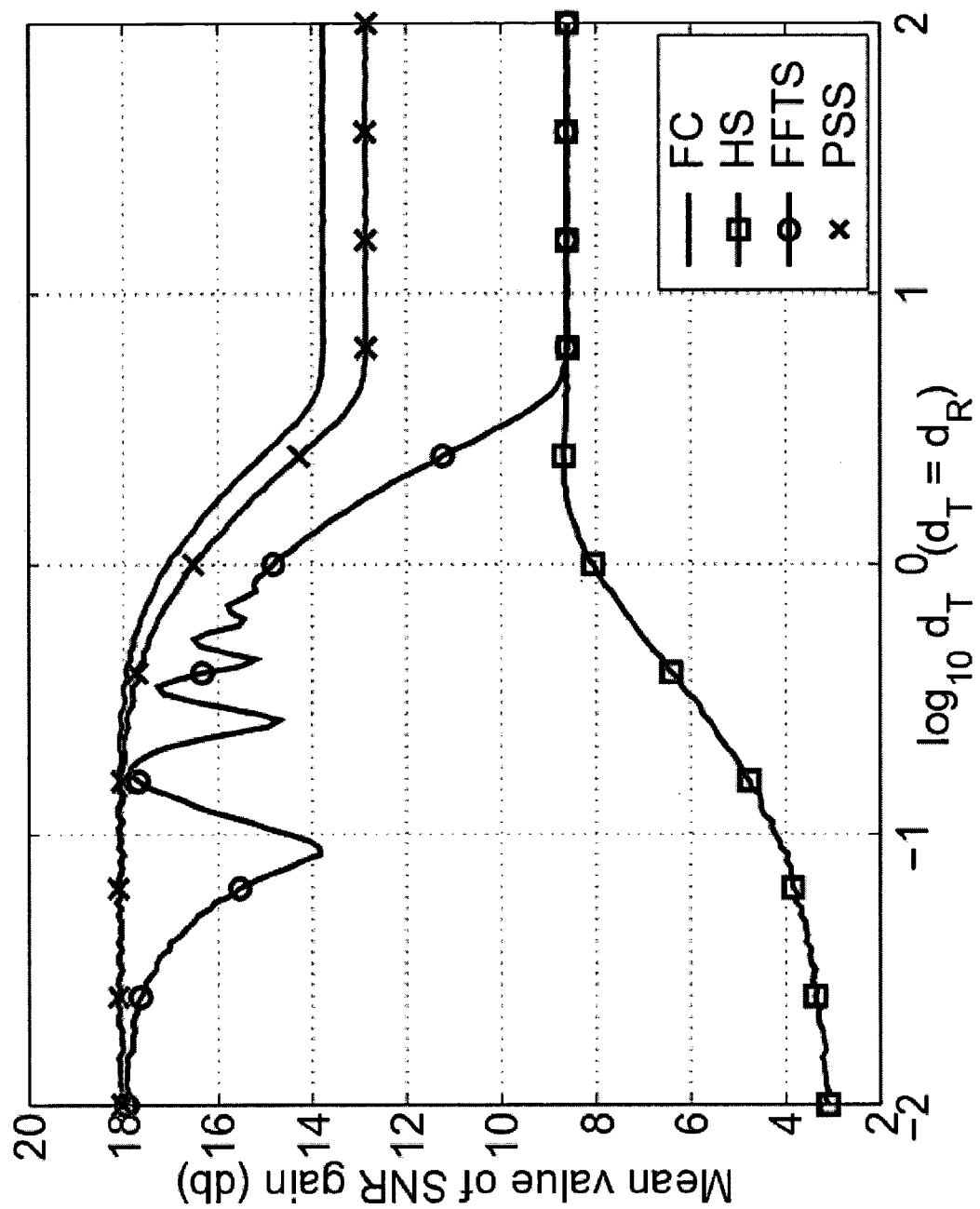
FIGS. 2 and 3 are graphs comparing RF signal processing techniques.

FIG. 2 compares the SNR gain of the four methods described above as a function of antenna spacing with diversity transmission. The parameters in the system are t=8, r=8, $L_t$=1, $L_r$=2. For large correlation, i.e., small antenna spacing, the FFTS method in the invention has a considerably larger SNR gain over the traditional HS-MRT/MRC method. In general, regardless of the correlation level in the channel, the PPS method in the invention can outperform both prior art selection methods. In fact with two or more RF branches, the PSS method can achieve the SNR gain of a full-complexity method.

Figure 3:
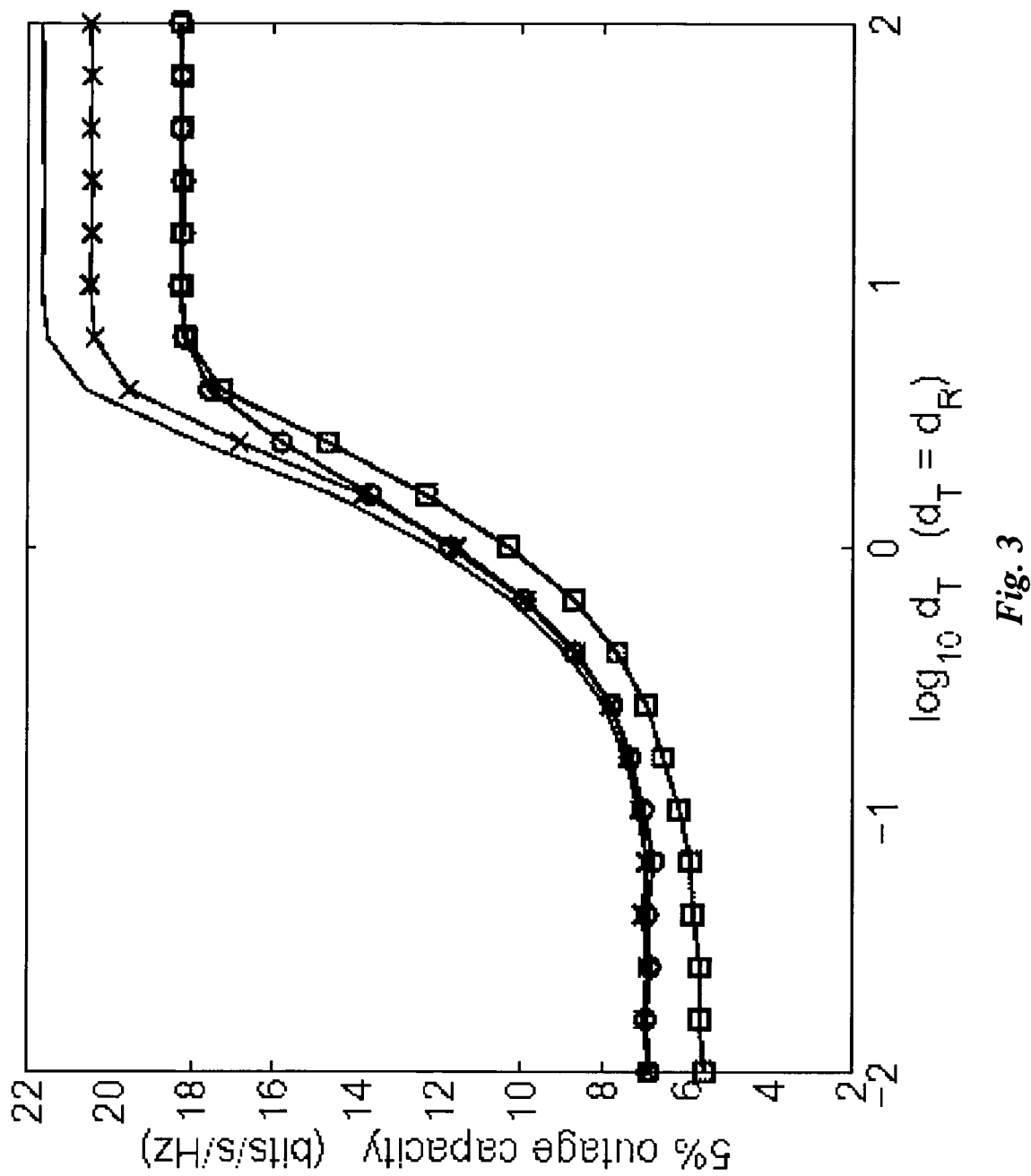

FIG. 3 displays the 5% outage capacity of the four methods for multiplexing transmission. The system parameters are t=3, r=8, $L_t$=3, $L_r$=3, p=20 db. A similar conclusion can be drawn from the plots: the FFTS shows a performance improvement for strongly correlated channels while the PPS works well for both strong and weak correlations.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for processing radio frequency (RF) signals in a multi-antenna system, comprising:
    generating $L_t$ input data streams in a transmitter with t transmit antennas, where t is an integer, and where $L_t$ is an integer less than or equal to t;
    modulating the $L_t$ input data streams to RF signals;
    switching the RF signals to t RF branches;
    applying a phase-shift transformation to the RF branches by a t×t matrix multiplication operator $\Phi_1$, whose output are t RF signals, and in which entries of the matrix $\Phi_1$ have constant modulus phase-only terms and the modulus phase-only terms adapt to an estimate of an average channel state;
    transmitting the t RF signals over a channel by the t transmit antennas;
    receiving the transmitted signals in a receiver with r receive antennas, where r is an integer;
    applying a phase-shift transformation to the r RF signals by a r×r matrix multiplication operator $\Phi_2$ to generate r streams;
    selecting $L_r$ signal streams from the r streams, where $L_r$ is an integer less than or equal to r;
    demodulating the $L_r$ signal streams; and
    processing the demodulated $L_r$ signal streams in baseband to recover output data streams corresponding to the input data streams.

2. The method of claim , in which each of the $L_t$ input data stream has a weight, and further comprising:
    summing the $L_r$ weighted data streams before the demodulating and decoding.

3. The method of claim 1, in which the $L_t$ input data streams are generated by a space-time block coder.

4. The method of claim 1, in which the $L_t$ input data streams are generated by a space-time trellis coder.

5. The method of claim 1, in which the input data streams are space-time layered structures.

6. The method of claim 1, in which t=$L_t$, and the matrix $\Phi_1$ is an identity matrix.

7. The method of claim 1, in which r=$L_r$, and the matrix $\Phi_2$ is an identity matrix.

8. The method of claim 1, in which the phase-only terms adapt to an estimate of an instantaneous channel state.

9. The method of claim 1, in which entries of the matrix $\Phi_2$ have constant modulus phase-only terms.

10. The method of claim 1, in which entries of the matrices $\Phi_1$ and $\Phi_2$ have constant modulus phase-only terms.

11. The method of claim 1, in which the matrix $\Phi_1$ is a fast Fourier transform matrix.

12. The method of claim 1, in which the matrix $\Phi_2$ is a fast Fourier transform matrix.

13. The method of claim 1, in which the matrices $\Phi_1$ and $\Phi_2$ are fast Fourier transform matrices.

* * * * *